United States Patent
Ran

(10) Patent No.: US 7,138,783 B2
(45) Date of Patent: Nov. 21, 2006

(54) ACTUATOR WITH CONTROL UNIT AND METHOD FOR OPERATING SAID ACTUATOR

(75) Inventor: Ping Ran, Shanghai (CN)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/927,298

(22) Filed: Aug. 26, 2004

(65) Prior Publication Data

US 2005/0046361 A1    Mar. 3, 2005

(30) Foreign Application Priority Data

Aug. 27, 2003  (DE) ................. 103 39 457

(51) Int. Cl.
*E05F 15/10* (2006.01)
(52) U.S. Cl. .............. 318/653; 318/265; 318/626
(58) Field of Classification Search ........ 318/264–267, 318/280, 286, 466–469, 590–591, 626, 653
See application file for complete search history.

(56) References Cited

U.S. PATENT DOCUMENTS

| | | | | |
|---|---|---|---|---|
| 3,562,464 A | * | 2/1971 | Vollum et al. ............. | 200/569 |
| 3,591,235 A | * | 7/1971 | Addison .................... | 299/1.2 |
| 3,670,457 A | * | 6/1972 | Berkholcs ................. | 451/213 |
| 3,720,864 A | * | 3/1973 | Kolhagen .................. | 318/138 |
| 3,733,747 A | * | 5/1973 | Fox et al. .................. | 49/30 |
| 3,735,298 A | * | 5/1973 | Colby ....................... | 335/206 |
| 3,893,594 A | * | 7/1975 | Carbine et al. ............ | 222/282 |
| 5,256,921 A | | 10/1993 | Pruis et al. ................ | 310/68 B |
| 5,293,104 A | | 3/1994 | Dreier ....................... | 318/280 |
| 6,118,243 A | * | 9/2000 | Reed et al. ................ | 318/468 |
| 6,657,351 B1 | * | 12/2003 | Chen et al. ................ | 310/171 |
| 6,850,017 B1 | * | 2/2005 | Domel et al. .............. | 318/138 |
| 6,868,323 B1 | * | 3/2005 | Kichima et al. ........... | 701/70 |

FOREIGN PATENT DOCUMENTS

| | | |
|---|---|---|
| DE | 3941651 | 6/1991 |
| DE | 295 14 786 U1 | 11/1996 |
| DE | 196 38 781 C2 | 9/1998 |
| DE | 195 14 954 C2 | 9/1999 |

* cited by examiner

*Primary Examiner*—Bentsu Ro
(74) *Attorney, Agent, or Firm*—Baker Botts L.L.P.

(57) ABSTRACT

The actuator and the method for operating the actuator comprise a drive unit and a drive mechanism with mechanical components that can be moved against each other as well as an electronic control unit. One of at least two components that can be moved against each other during operation acts as a switching transducer and initiates a switching operation in the event of relative movement in respect of a switching element, for example a Reed switch, caused by the action of an external force. This switching operation is used in the course of the control method to switch the control unit from a first operating mode to a further operating mode.

13 Claims, 2 Drawing Sheets

ACTUATOR WITH CONTROL UNIT AND METHOD FOR OPERATING SAID ACTUATOR

PRIORITY

This application claims priority to German application no. 103 39 457.5 filed Aug. 27, 2003.

TECHNICAL FIELD OF THE INVENTION

The present invention relates to an actuator with an electronic control unit, whereby the actuator comprises a drive unit and a drive mechanism, with mechanical components that can be moved against each other and a method for operating said actuator.

BACKGROUND OF THE INVENTION

Such actuators are deployed in particular in motor vehicles. They are used there for example as actuators for sliding roofs, window lift systems, door locking systems, windshield wipers, solar protection systems and other power-activated control elements. The drive units deployed in such cases are preferably permanent-field direct current electric motors. Electronic control units linked to corresponding sensors are deployed to activate the drive units, monitor the current position of the actuators and to identify or monitor further parameters, e.g. actuating force and actuating speed.

Such an actuator with an electric motor is for example known from the utility model DE 295 14 786 U1. An actuator, in particular in the form of an electric motor transmission unit, is disclosed there for moving power-activated windows, partition walls or roof element systems in motor vehicles with a defined closing force limit in the event of impact with an obstacle. For this the actuator is controlled via a control device as a function of detected stroke position, so that the maximum permissible closing force is not exceeded in the event of impact with an obstacle. Stroke position detection is thereby a function of a speed or position sensor of the actuator, for example a speed or position sensor assigned to the rotor shaft of the electric motor. The respective stroke position of the window is detected from the rotor position of the commutator motor based on a first recorded initialization position and subsequent detection of the rotation of the rotor shaft via the speed/rotation angle or position sensor in the control device.

The patent document DE 196 38 781 C2 also discloses such an actuator, in particular for moving windows, partition walls or roof element systems in motor vehicles. Actuators of this type contain a commutator motor, the rotor shaft of which engages as a transmission shaft with a worm wheel, which drives the respective closing element. To achieve effective protection against trapping with low outlay with regard to control and measurement technology, a speed-dependent travel sensor is used, to determine the speed limit value of significance for closing force limitation in the control unit, taking into account sluggishness as a function of the stroke.

A further actuator for moving a vehicle window is known from the patent document DE 195 14 954 C2. With this actuator the closing force is limited by detecting the motor current and stroke of the window. When adjustable limit values are reached, the drive is disconnected, whereby the limit value is defined so that a specific motor current is stored in a control unit for every window position.

With actuators of the above type it is necessary for the control unit to know the current position of the control element all the time during operation. As changes in the position of the control element, as a function of the transmission mechanism, can also result due to the action of an external force on the control element, the sensor arrangement for detecting the position of the control element must be kept in permanent standby mode, even when the actuator is at rest. This requires a constant supply of power to the electrical sensor elements and associated electronic control system, therefore constant energy consumption. As particularly when using such actuators in motor vehicles, the energy available in the vehicle electrical system is limited, it is particularly important to keep energy consumption to a minimum.

SUMMARY OF THE INVENTION

The object of the invention is therefore to create an actuator and a method for its control, which allow the energy requirement to be kept to a minimum despite constant monitoring of the position of the control element, in particular when the actuator is at rest.

This object can be achieved by an actuator for moving a power-activated control element, comprising a drive unit, a drive mechanism, and an electronic control unit to control/regulate the actuator, wherein the drive unit and/or the drive mechanism comprise at least one mechanical component, which acts as a switching transducer, the drive unit and/or the drive mechanism comprise at least one further mechanical component with a switching element, the switching transducer and the switching element interact with each other, the switching transducer and the switching element move in relation to each other both due to the driving of the actuator by the drive unit on a drive side and due to the action of an external force via the control element on an output side, and the switching element switches due to relative movement between the switching transducer and the switching element even when the operating energy supply to the actuator is disconnected.

The switching transducer can be a magnet wheel, which is connected in a fixed manner to a mechanical component of the actuator rotating about an axle/shaft or is connected to this for drive purposes. The switching element can be a Reed switch, which is designed with a normally open contact, a normally closed contact or with a changeover contact. The drive unit can be an electric motor, which comprises a stator and a rotor with a rotor shaft, whereby the switching transducer is connected to the rotor or the rotor shaft in a fixed manner or is in connected to these for drive purposes.

The object can also be achieved by an actuator for moving a power-activated control element, comprising a drive unit and a drive mechanism comprising at least a first and second mechanical component which move in relation to each other both due to the driving of the actuator by the drive unit on a drive side and due to the action of an external force via the control element on an output side to generate a switching signal wherein the switching signal is generated even when the operating energy supply to the actuator is disconnected, and an electronic control unit to control/regulate the actuator.

The first mechanical component can be a magnet wheel, which is connected in a fixed manner to a component of the actuator rotating about an axle/shaft or is connected to this for drive purposes. The second mechanical component can be a Reed switch, which is designed with a normally open contact, a normally closed contact or with a changeover contact. The drive unit can be an electric motor, which comprises a stator and a rotor with a rotor shaft, whereby the first mechanical component is connected to the rotor or the rotor shaft in a fixed manner or is in connected to these for drive purposes.

The object can further be achieved by a method for operating an actuator for moving a power-activated control element, which comprises a drive unit, a drive mechanism, and an electronic control unit to control/regulate the actuator, wherein the electronic control unit can go into a first operating mode and at least one further operating mode, the method comprising the steps of:

supplying a switching signal generated by a switching operation of a switching element via an electrical connection to the control unit, initiating the switching operation of the switching element by a relative movement between a switching transducer and the switching element even when an operating energy supply to the actuator is disconnected, causing the relative movement between the switching transducer and switching element by an action of an external force on an output side, and switching the control unit by the switching operation of the switching element from the first to a further operating mode.

The first operating mode can be an energy saving mode, in which the operating energy supply to the actuator and/or the control unit is disconnected. If the actuator is not activated for a specific time period, the control unit can be automatically switched to the first operating mode. After switching from the first operating mode to a further operating mode the change in the position of the control elements caused by the action of an external force can be determined by the control unit. The change in the position of the control elements caused by the action of an external force can be reset by the control unit after the control unit switches from the first operating mode to a further operating mode. The switching operation, by means of which the control unit switches from the first operating mode to the further operating mode, can be initiated by a further external signal supplied to the control unit.

The actuator for moving power-activated control elements, in particular in motor vehicles, comprises a drive unit and a drive mechanism, with at least two mechanical components that can be moved against each other and an electronic control unit to control/regulate the actuator. One of the at least two mechanical components that can be moved against each other during operation acts as a switching transducer and the other comprises an assigned switching element. The switching transducer and switching element interact with each other so that the switching element switches in the event of relative movement between these two components caused by the action of an external force, even when the operating energy supply to the actuator is disconnected.

The method for operating the actuator is based on the fact that the control unit can go into a first operating mode and at least one further operating mode, whereby the control unit is switched by a switching signal from the first to a further operating mode. The switching signal is initiated by a relative movement between the switching transducer and the switching element caused by the action of an external force on an output side, even when the energy supply to the actuator is disconnected, and is supplied to the control unit via an electrical connection.

The advantages achieved with the invention are that, when the actuator is at rest, the sensors and the electronic control unit can be switched to a passive operating mode (energy saving mode), with minimized energy consumption. In such a passive operating mode for example the operating energy supply to the actuator can be disconnected. If the position of the control element changes due to the action of an external force, a switching operation is initiated by the switching transducer/switching element arrangement and the control unit is switched back to active operating mode. As the actuator remains at rest for long periods during operation once the required control element position has been set, during which time the control unit can be switched to energy saving mode, the invention allows a significant reduction in energy consumption to be achieved during operation. This is a considerable advantage, particularly when a limited amount of energy is available, as is the case in motor vehicles for example.

BRIEF DESCRIPTION OF THE DRAWINGS

Advantageous embodiments are disclosed in the subclaims. Exemplary embodiments of the invention are described in more detail below with reference to the schematic diagrams in the drawing.

DETAILED DESCRIPTION OF THE PREFERRED EMBODIMENTS

Figure 1:
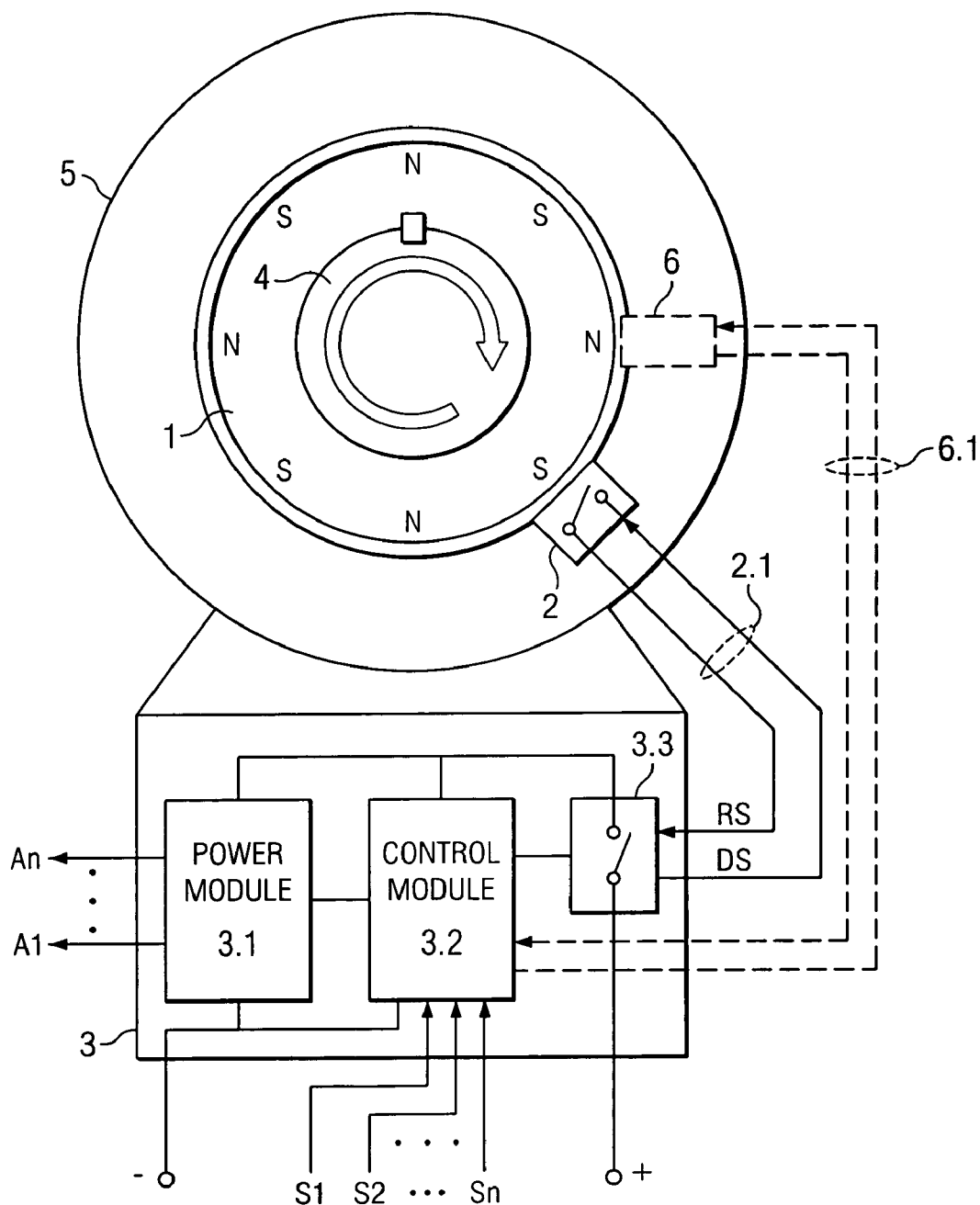
FIG. 1 shows a simplified arrangement of switching transducer and switching element and the electronic controller with terminals for controlling the actuator.

FIG. 1 shows a switching transducer in the form of a magnet wheel 1, with alternately magnetized magnetic poles N and S distributed at regular intervals on the circumference. The magnet wheel 1 is arranged in a fixed manner on a drive shaft 4, so that the magnet wheel 1 can rotate with the drive shaft 4 in relation to the housing element 5. A switching element 2 is arranged in a fixed position or fixed to the housing on the housing element 5 at a radial distance from the outer circumference of the magnet wheel 1 and interacts with the magnet wheel 1.

The electronic control unit 3 has a power module 3.1 for power activation of a drive, a control module 3.2 for processing input signals and an operating mode module 3.3 for switching to different operating modes. The power module 3.1 is connected electrically to the control module 3.2 and has power terminals A1 to An, to which the drive unit, preferably an electric motor, is connected. The control module has a plurality of signal inputs S1 to Sn, via which external control signals can be supplied. The switching element 2 is connected via connecting leads 2.1 to the operating mode module 3.3 of the control unit 3.

A signal detector 6 at a radial distance from the magnet wheel 1 is shown with a broken line and is also attached to the housing element 5 and connected by means of connecting leads 6.1 to the electronic control unit. This is used for example as a speed/rotation angle sensor during activation of the actuator and thereby for determining the current position of the control element during active operation of the actuator.

A separate arrangement of the magnet wheel 1 or another switching transducer with rotational symmetry on a separate shaft/axle in the housing and a direct or indirect drive connection between the drive shaft 4 and the switching transducer are also possible.

Switching transducer with a linear configuration can also be used, which are displaced by means of a translatory drive connection or transmission translation in a linear relative movement in respect of the switching element.

As it is only a matter of the relative movement between the switching transducer and the switching element, the reverse of the principle is of course also possible. This results in a switching transducer mounted in a fixed position or fixed to the housing and a switching element moved in a rotational or translatory manner directly or indirectly by a drive in respect of the switching transducer.

If a component magnetized with alternating poles is used as the switching transducer, what is known as a Reed switch can advantageously be deployed as the switching element 2, acting as a magnetically activated switch and being switched magnetically independently of a supply current. This Reed switch can be configured with a normally open contact, a normally closed contact or even with a changeover contact.

In the case of an external mechanical force acting on the drive shaft, for example due to manual adjustment, the magnetic switching transducer moves in relation to the Reed switch. The resulting change to the magnetic pole at the Reed switch changes its switching status from open to closed or vice versa.

A control voltage is present at the Reed switch independently of the operating power supply to the actuator. During switching positive and negative voltage changes are generated. This signal is supplied to the operating mode module 3.3 of the attached electronic control unit 3. The voltage changes are even identified in energy saving mode by the operating mode module 3.3, which then switches to a further defined operating mode.

In one advantageous embodiment the actuator is driven using an electric motor, which comprises a stator and a rotor with a rotor shaft. The rotor shaft of the electric motor hereby forms the drive shaft 4, to which the magnet wheel is attached in a fixed manner, for example by pressure or adhesion. Other positive connections allowing joint rotation, such as parallel keys or gear teeth, can also be used.

A method is used for operation of the actuator based on the arrangement and configuration of the actuator. A feature of the method is that the control unit can go into at least two different operating modes. The operating mode module 3.3 of the control unit as shown in FIG. 1 is for example used to switch between the different operating modes and is connected electrically to the control module 3.2.

Figure 2:
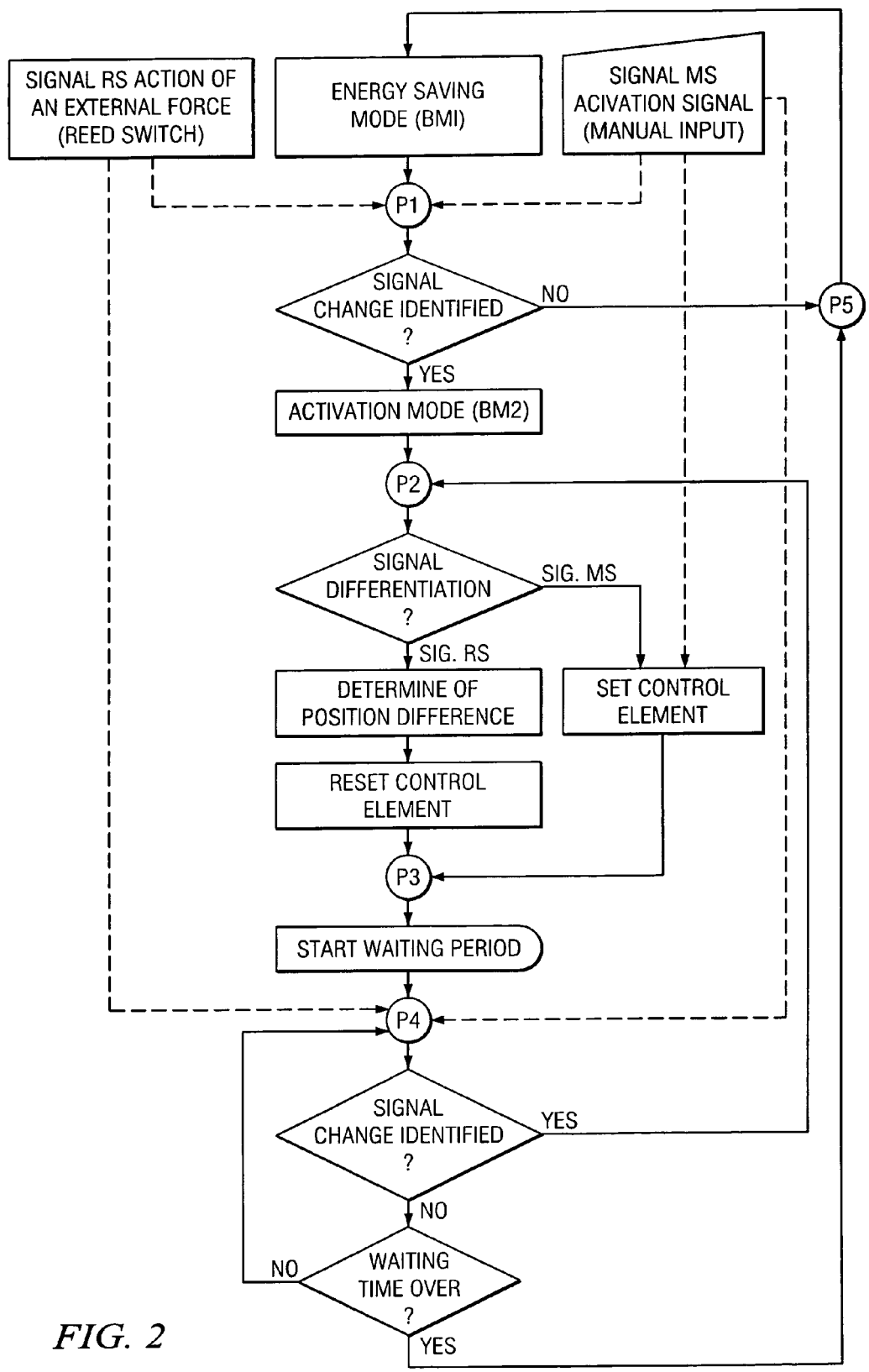
FIG. 2 shows a flow diagram of the method for operating the actuator with two operating modes.

FIG. 2 shows a sequence of the method in a flow diagram for a basic configuration stage.

In this basic configuration stage two operating modes BM1 and BM2 are available. The first operating mode is a passive energy saving mode BM1, which is characterized in that the operating energy supply to the actuator and/or the control unit is wholly or partially disconnected or is limited to specific functional units. This reduces the energy consumption of the control to a minimum. A further operating mode, in this case the second, can be designated as an active or activation mode BM2. In activation mode BM2 the operating energy supply for the power module 3.1 and the control module 3.2 is switched on, the actuator is in standby mode and can be activated via the drive unit.

In FIG. 1 these two operating modes are achieved by the switch shown in the operating mode module 3.3, which switches on or disconnects the operating energy supply.

Starting from energy saving mode BM1 the switching operation can be initiated to activation mode BM2 by a signal RS, which is supplied by the switching element 2 via the connecting leads 2.1 to the operating mode module 3.3. This signal is independent of the operating energy supply to the actuator and is initiated by the relative movement of the switching transducer, which is shown as a magnet wheel 1 in FIG. 1.

The switching operation from energy saving mode BM1 to activation mode BM2 can also be initiated by a further external activation signal MS, which is evaluated via one of the signal inputs S1 to Sn of the control module 3.2. This signal can for example be generated by a simple manually operated switch and be supplied via one of the signal inputs S1 to Sn to the control module 3.2. A switching signal is generated in the control module 3.2, in some instances as a function of further operating variables, which can also be input via the signal inputs S1 to Sn, and this switching signal initiates a switching operation in the operating mode module 3.3 and switches to an assigned operating mode.

In the flow diagram in FIG. 2 signals RS and MS are merged at the same points P1 and P4 in the program sequence, followed in each instance by signal change identification. If neither of the two signals is identified by the controller for example by means of a positive signal edge, the control unit remains in energy saving mode BM1, which is shown in the flow diagram in FIG. 2 as a program loop from signal change identification via point P2 back to the start of energy saving mode (BM1).

After identifying a signal change the control unit switches immediately to activation mode BM2. In the next stage an evaluation determines which of the two possible input signals was output and the further stages of the sequence are a function of this evaluation.

If the signal edge was the signal RS of the Reed switch, the stages "Determine position difference" and in some instances "Reset control element" are implemented. This is particularly advantageous when determining the relative position of the actuator.

When determining the relative position of the control element based on a reference point, for example using a separate speed/rotation angle sensor 6, differences can occur in the position of the control element due to the action of an external force on the control element, when the operating energy supply is disconnected. As in energy saving mode BM1 the sensors and/or electronic system for detecting the speed/rotational position of the drive shaft are also disconnected in some instances, the slight change in rotational position caused by the action of an external force cannot be directly identified by the control unit until the switch to activation mode BM2, as a result of which stored position data differs from the actual position of the control element. During operation such unidentified position differences can accumulate and result in significantly incorrect positioning of the control element.

To prevent this, the position data determined is corrected in the control module after the switch to activation mode BM2. This takes place on the basis of the known unchanging geometric conditions of the actuator and the switching transducer. In the example shown in FIG. 1 a permanently defined rotation angle between the signal edges generated in the switching element is defined by the regular pole intervals on the magnet wheel. For example counting the signal edges of the switching element 2 up to the switching point to activation mode allows the change in position up to this point to be detected quantitatively using the control module.

Knowledge of the quantitative position change can be used in the next stage to correct the position of the control element, i.e. to reset the change in the relative position of the control element caused by the action of an external force or even to correct the position data stored in the control module.

If however the switch to activation mode is initiated by the activation signal MS, the drive unit is started up and the control element is driven in the predefined direction until an end position is reached or the activation signal, which is also supplied in this program stage (broken line) is canceled.

The two different branches of the flow diagram come together again at point P3, followed by the further sequence for switching back to energy saving mode. The switch back from activation mode to power saving mode can be effected automatically as a function of time by the control module 3.2. A waiting period is started for this purpose after termination of the control operation (reset/activation). During the waiting period the control unit is in activation mode and in a program loop, in which the signals RS and MS are monitored, while the waiting period continues. If a new signal change takes place before the end of the waiting period, the program sequence in FIG. 2 returns to point P2 before signal differentiation. If the waiting period is over and no new activation has taken place, the program sequence returns to the start and the switch to energy saving mode is initiated.

Further different operating modes can be provided as required. For example a standby mode can be defined, in which the operating energy supply to the power module is disconnected but the energy supply to the control module is switched on.

I claim:

1. An actuator for moving a power-activated control element, comprising a drive unit, a drive mechanism, and an electronic control unit to control/regulate the actuator, wherein:
   the drive unit and/or the drive mechanism comprise at least one mechanical component, which acts as a switching transducer,
   the drive unit and/or the drive mechanism comprise at least one further mechanical component with a switching element,
   the switching transducer and the switching element interact with each other,
   the switching transducer and the switching element move in relation to each other both due to the driving of the actuator by the drive unit on a drive side and due to the action of an external force via the control element on an output side,
   the switching element switches due to relative movement between the switching transducer and the switching element caused by the external force and occurring when the operating energy supply to the actuator is disconnected; and
   the electronic control unit having a first operating mode comprising an energy saving mode wherein the operating energy supply to the actuator is disconnected and at least one further operating mode.

2. The actuator according to claim 1, wherein the switching transducer is a magnet wheel, which is connected in a fixed manner to a mechanical component of the actuator rotating about an axle/shaft or is connecting to this for drive purposes.

3. The actuator according to claim 1, wherein the switching element is a Reed switch, which is designed with a normally open contact, a normally closed contact or with a changeover contact.

4. The actuator according to claim 1, wherein the drive unit is an electric motor, which comprises a stator and a rotor with a rotor shaft, whereby the switching transducer is connected to the rotor or the rotor shaft in a fixed manner or is in connected to these for drive purposes.

5. A method for operating an actuator for moving a power-activated control element, which comprises a drive unit, a drive mechanism, and an electronic control unit to control/regulate the actuator, wherein the electronic control unit can go into a first operating mode and at least one further operating mode, the method comprising the steps of:
   supplying a switching signal generated by a switching operation of a switching element via an electrical connection to the control unit,
   initiating the switching operation of the switching element by a relative movement between a switching transducer and the switching element even when an operating energy supply to the actuator is disconnected,
   causing the relative movement between the switching transducer and switching element by an action of an external force on an output side,
   switching the control unit by the switching operation of the switching element from the first to a further operating mode, and
   wherein the first operating mode is an energy saving mode, in which the operating energy supply to the actuator and/or the control unit is disconnected.

6. The method for operating an actuator according to claim 5, wherein, if the actuator is not activated for a specific time period, the control unit is automatically switched to the first operating mode.

7. The method for operating an actuator according to claim 5, wherein after switching from the first operating mode to a further operating mode the change in the position of the control elements caused by the action of an external force is determined by the control unit.

8. The method for operating an actuator according to claim 5, wherein the change in the position of the control elements caused by the action of an external force is reset by the control unit after the control unit switches from the first operating mode to a further operating mode.

9. The method for operating an actuator according to claim 5, wherein the switching operation, by means of which the control unit switches from the first operating mode to the further operating mode, is initiated by a further external signal supplied to the control unit.

10. An actuator for moving a power-activated control element, comprising:
   a drive unit and a drive mechanism comprising at least a first and second mechanical component which move in relation to each other both due to the driving of the actuator by the drive unit on a drive side and due to the action of an external force via the control element on an output side to generate a switching signal wherein the switching signal is generated even when the operating energy supply to the actuator is disconnected, and
   an electronic control unit to controllregulate the actuator, the electronic control unit having a first operating mode comprising an energy saving mode wherein the operating energy supply to the actuator is disconnected and at least one further operating mode.

11. The actuator according to claim 10, wherein the first mechanical component is a magnet wheel with alternatively magnetized magnetic poles distributed at intervals on the circumference of the magnet wheel, which is connected in a fixed manner to a component of the actuator rotating about an axle/shaft or is connected to this for drive purposes.

12. The actuator according to claim 10, wherein the second mechanical component is a Reed switch, which is designed with a normally open contact, a normally closed contact or with a changeover contact.

13. The actuator according to claim 10, wherein the drive unit is an electric motor, which comprises a stator and a rotor with a rotor shaft, whereby the first mechanical component is connected to the rotor or the rotor shaft in a fixed manner or is in connected to these for drive purposes.

* * * * *